B. F. MASON.
MACHINE FOR MAKING BISCUITS AND CRACKERS.
No. 1,221. Patented July 6, 1839.
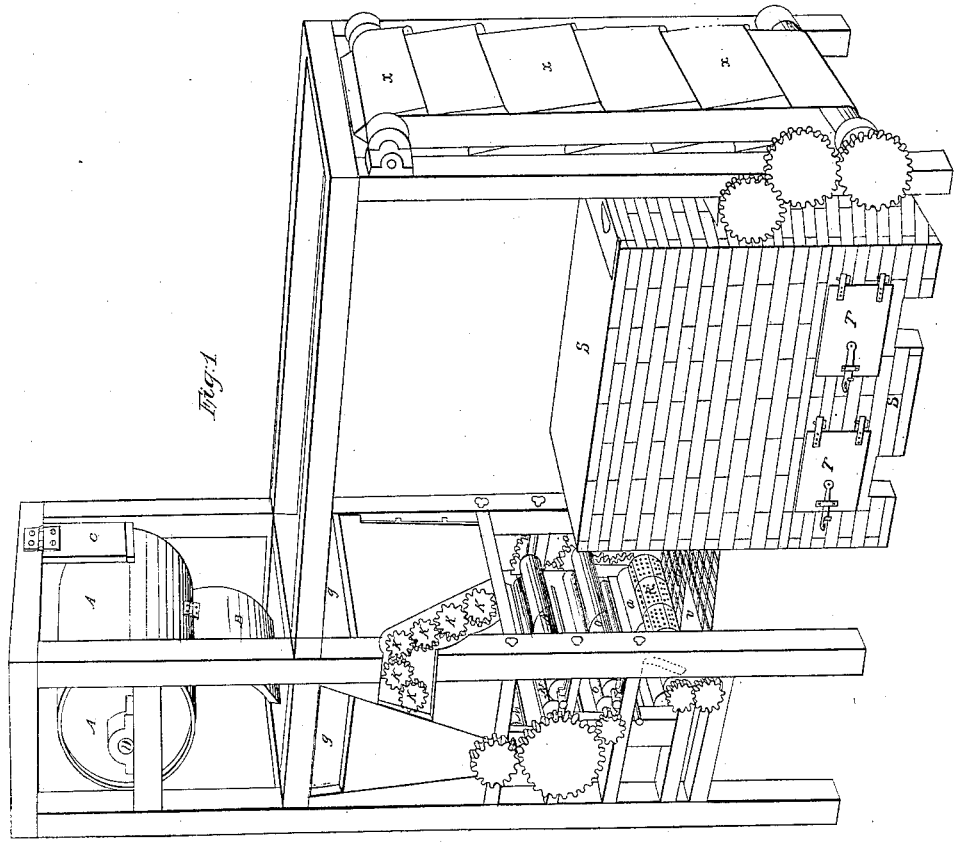

2 Sheets—Sheet 2.
B. F. MASON.
MACHINE FOR MAKING BISCUITS AND CRACKERS.
No. 1,221. Patented July 6, 1839.
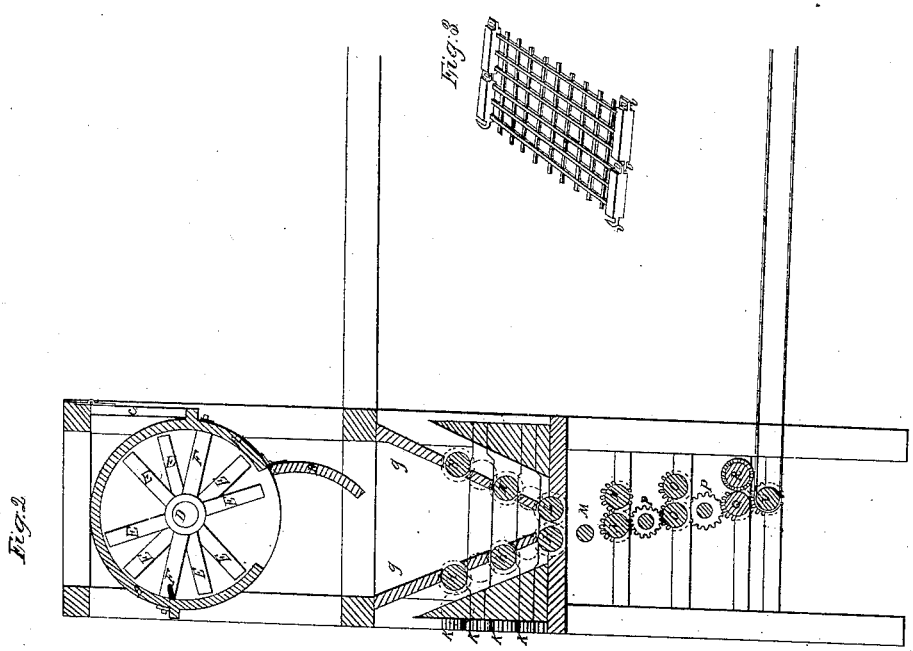

UNITED STATES PATENT OFFICE.

BENJN. F. MASON, OF KENNEBUNK PORT, MAINE.

MACHINE FOR MAKING AND BAKING BISCUITS AND CRACKERS.

Specification of Letters Patent No. 1,221, dated July 6, 1839.

*To all whom it may concern:*

Be it known that I, BENJAMIN F. MASON, of Kennebunk Port, in the county of York and State of Maine, have invented a new and useful Machine for Manufacturing Crackers and Biscuits of Various Kinds, in which machine the flour and water, with such other materials as may enter into the composition of the crackers or biscuits, are put into a suitable mixing apparatus or dough-maker and break, in which they are thoroughly intermingled, made into dough, and the dough perfectly broken. From this apparatus, said dough is delivered into a hopper and thence conducted between pairs of rollers by which it is rolled out of the desired thickness. It is then cut into square or other formed biscuits by the aid of a cutting-roller and also at the same time pricked or perforated with holes. By this cutting roller and its fellow or antagonist roller the biscuits are delivered onto an endless revolving iron apron, by which they are carried into and through a perpetual oven, kept heated by suitable furnaces, in their passage through which oven they are baked and are ready to be packed for use. To this apparatus I sometimes append elevators into which the biscuits fall from the endless apron and by which they may be conducted to any desired part of the building; and I, the said BENJAMIN F. MASON, do hereby declare that the following is a full and exact description of my said invention.

Figure 1, in the accompanying drawing is a perspective view of the whole apparatus; and Fig. 2, a section of the main operating part thereof, by which the biscuits are prepared for the oven.

The same letters of reference are employed in both these figures to designate the same parts of the apparatus.

A, A, is the mixing apparatus, which consists of a cylindrical, hollow vessel, within which a shaft revolves that carries knives, mixers, or breakers, which, as they revolve, pass between similar knives, mixers, or breakers, that are attached to the interior of the vessel, and remain stationary while the shaft, with its knives, is made to revolve by the application of any sufficient power thereto.

When the dough is to be made, a sufficient quantity of the respective materials is put into the vessel A, which I usually make of such size as to contain a barrel of flour, with the other ingredients. The door B, is then closed, and the vessel is held stationary by bringing a pawl C, into contact with it, there being cleats on the vessel, against which the pawl bears, and retains it in its place. The axle D, is then made to revolve, and with it the knives E, E, E, which are attached to it; and between these and the stationary knives F, F, the mixing and breaking are effected. Of the revolving knives E, E, I, usually, employ twenty; these being formed by placing four knives at five different points on the revolving shaft, said knives, consequently, forming a cross, or standing at right angles with each other. The intermediate, or fixed, knives, consist of four bars crossing the center of the vessel A, and fastened to it at each of their ends, by nuts and screws. These bars are enlarged and perforated at their centers so as to allow the revolving shaft to pass through, and turn within, them. They thus constitute eight knives, between, and on the outside of, which, the twenty upon the shaft revolve; to render the action of these the more perfect, I sometimes give to the revolving shaft a traversing motion endwise, which may be effected by forming an inclined groove around one of its projecting axles, into which a guide pin may be made to pass; or this traversing motion may be effected in other ways.

The vessel A, when intended to receive a barrel of flour, I make three feet long, and two feet in diameter. The knives I make about two inches wide, and half an inch thick; the strength thus given to them being necessary to their stability. By this apparatus, thus arranged, a barrel of flour may be completely mixed into dough, and the dough sufficiently broken, in a very short period of time.

When the mixing is completed, the pawl C, is raised, and the vessel A, turned around so as to have its door B, downward, and this being opened, the dough falls into the hopper G, G. Within this hopper, on each of its sides, a number of rollers H, H, H, are made to revolve, for the purpose of keeping the dough dusted, and of increasing its tendency to descend toward the bottom of the hopper. I, I, I, are spaces which surround the hopper, and are filled with flour, and as the rollers H, H, H, extend out into the spaces I, I, as well as into the hoppers, the flour is carried by them to the dough, and the dusting effected. The rollers H, H, H, are driven by suitable cog, or other, gearing. The toothed pinions K, K, K, are represented as employed with this view. The rollers may be adjusted by means of set screws, or otherwise.

The trough has an opening along its bottom, of about three feet in length, at which opening the cylindrical rollers L, L, are placed, by which the dough is rolled out, and prepared for the subsequent action of other pairs of rollers below them, by which it is successively reduced, and brought to the proper thickness.

M, is a guide roller, below L, L, and there may be others between the respective pairs of rollers; these guide rollers I intend, sometimes, to cover with cloth, or other suitable material, and to allow them to revolve in troughs containing flour, so as to operate as dusting rollers to the plated dough.

N, N, and O, O, are plating rollers, which successively receive the dough, and operate upon it and between these pairs other guide, or dusting, rollers are shown as placed at P, P. The dough being prepared to be cut into biscuits, by passing through the plating rollers, is received between rollers Q, and R, the former of which is a plain roller, and the latter of which is divided into compartments of the size and form of the biscuit to be cut; the cutting being effected by knives, or cutters, running along and around its surface, and rising therefrom to a height corresponding to the thickness to which the dough has been reduced. Within these compartments, points, or prickers, are to be inserted, and they may also contain stamps for marking the biscuit. I likewise use pistons, or weighted, sliding bottoms, to force the biscuits out of the compartments, by their gravity, as in some other biscuit and cracker machines.

S, S, Fig. 1, is a representation of the exterior of the oven, T, T, being the doors of furnaces by which it may be heated. At each end of this oven, there is an opening for cutting roller; the place of this endless apron which the biscuits are deposited from the cutting roller; the place of this endles apron is shown at U, U; but for the manner in which I construct it I refer to Fig. 3, which is a representation of two sections of it hooked together. These sections I, usually, make of cast-iron, in the form of grating, and with hooks, or clasps, V Fig. 3 at their corners by means of which they may be connected together, and constitute an endless, iron apron. The individual sections I make three inches wide, and two feet, or upward, in length. They may, of course, be made of wrought-iron, if preferred. The rollers around which the endless apron passes, I make about six inches in diameter, and hexagonal, so that the endless apron may bend regularly around it, the width of its sides being such as to adapt it to the reception of one section of the endless apron; one of these rollers is shown at V, the other being on the shaft of the wheel W. Within the oven, there are friction rollers which support the weight of the endless apron.

Flues leading from the furnaces surround the oven, but in the formation of these there is not any thing peculiar, and they may be constructed by any competent workman. The top and bottom of the oven, as well as the sides forming the aperture through which the endless apron passes, I make of cast-iron plates; and the oven must be of such length as will be necessary for the baking of the biscuits during the time of their passing through it, which requires about ten minutes. One of thirty feet in length I usually prefer; and the speed of the preparing apparatus must be such as to allow of the necessary time for the baking operation. There may be any number of furnaces found necessary. The power requisite to give motion to the machinery may be obtained by generating steam from the waste heat of the furnaces; and to effect this, I intend to place a steam boiler in the upper part of the stack containing the oven, and to allow the flues which have passed around the oven to pass around this also, so as to produce the steam to work a small steam engine; intending to construct said engine and its appurtenances in any of the known modes of so doing which I may deem best adapted to my purpose.

X, X, is a series of elevators, or pockets, into which the biscuits may fall as they are delivered from the oven, and by which they may be conducted to any desired elevation, to be packed, or otherwise disposed of.

Having thus, fully described the construction and operation of my machine, or apparatus, for manufacturing biscuits and crackers of various kinds, and also the manner in which the same is used, and operates, I do hereby declare that I do not claim the individual parts, generally, in their separate characters; several of these having been previously known and used for purposes similar to that to which I have applied them; but not, as I verily believe, under the combination and arrangement devised by me, and above set forth. I do not, for example, claim the plating out of dough to be cut into biscuits, or crackers, by means of successive pairs of rollers; or the cutting of such biscuits or crackers, by means of a revolving roller furnished with suitable cutters; or the delivery of them from said roller, on to an endless apron, by which they are conveyed away, and made ready for baking. But I do claim—

1. The combination and arrangement of the respective parts, substantially as described, for the purpose of performing and completing all the operations, from the mixing materials to the delivery of the biscuits, perfectly baked.

2. I claim the manner of constructing and the combination of the mixing apparatus with the hopper.

3. I claim the particular manner of constructing the hopper with the dusting rollers, and spaces for containing flour to be fed in by them, as set forth.

4. I claim the delivering of the biscuits and crackers on to the endless apron of iron, constructed and operating in the manner described, and to be passed thereon through a perpetual oven, whence they are delivered completely baked.

B. F. MASON.

Witnesses:
Thos. P. Jones,
George West.